United States Patent
Choi et al.

(10) Patent No.: US 12,482,810 B2
(45) Date of Patent: Nov. 25, 2025

(54) POSITIVE ELECTRODE ACTIVE MATERIAL FOR LITHIUM SECONDARY BATTERY, METHOD FOR PREPARING SAME, AND LITHIUM SECONDARY BATTERY INCLUDING SAME

(71) Applicant: ECOPRO BM CO., LTD., Chungcheongbuk-do (KR)

(72) Inventors: Moon Ho Choi, Chungcheongbuk-do (KR); Seung Hyun Choi, Chungcheongbuk-do (KR); Ra Na Lim, Chungcheongbuk-do (KR); A Reum Yang, Chungcheongbuk-do (KR)

(73) Assignee: ECOPRO BM CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 18/247,326

(22) PCT Filed: Dec. 2, 2021

(86) PCT No.: PCT/KR2021/018087
§ 371 (c)(1),
(2) Date: Mar. 30, 2023

(87) PCT Pub. No.: WO2022/119338
PCT Pub. Date: Jun. 9, 2022

(65) Prior Publication Data
US 2023/0387403 A1    Nov. 30, 2023

(30) Foreign Application Priority Data

Dec. 4, 2020  (KR) .................. 10-2020-0168858
May 25, 2021  (KR) .................. 10-2021-0067237
(Continued)

(51) Int. Cl.
*H01M 4/505* (2010.01)
*C01G 53/00* (2025.01)
(Continued)

(52) U.S. Cl.
CPC ............ *H01M 4/364* (2013.01); *C01G 53/44* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS 9,525,173 B2    12/2016  Kagei et al.
10,079,384 B2    9/2018  Kim et al.
(Continued)

FOREIGN PATENT DOCUMENTS

CN    109244431 A1    1/2019
EP    3327834 A1    5/2018
(Continued)

OTHER PUBLICATIONS

English translation of Kaneda et al. (JP 2019/114327) (Year: 2019).*
(Continued)

*Primary Examiner* — Ronak C Patel
(74) *Attorney, Agent, or Firm* — Leason Ellis LLP

(57) ABSTRACT

A positive electrode active material for a secondary battery comprises a lithium composite oxide represented by chemical formula 1 below and containing a layer-structured lithium excess oxide, wherein the lithium composite oxide comprises a secondary particle; the secondary particle comprises at least one primary particle; the primary particle comprises at least one crystallite; at least any one of the secondary particle, the primary particle, or the crystallite
(Continued)

comprises a core and a shell occupying at least a portion of the surface of the core. When the crystal structure of space group C2/m is designated as [C2/m], the crystal structure of space group R-3m is designated as [R-3m], and the ratio of the crystal structure of space group C2/m versus the crystal structure of space group R-3m is designated as [C2/m]/[R-3m], the [C2/m]/[R-3m] of the core differs from that of the shell in the secondary particle: [chemical formula 1] $rLi_2MlO_3 \cdot (1-r)Li_aM2O_2$.

9 Claims, 13 Drawing Sheets

(30) Foreign Application Priority Data

Jun. 21, 2021 (KR) ........................ 10-2021-0080132
Jun. 21, 2021 (KR) ........................ 10-2021-0080133

(51) Int. Cl.
    *C01G 53/44*    (2025.01)
    *H01M 4/36*     (2006.01)
    *H01M 4/525*    (2010.01)
    *H01M 10/052*   (2010.01)
    *H01M 4/02*     (2006.01)

(52) U.S. Cl.
    CPC ......... *H01M 4/525* (2013.01); *H01M 10/052* (2013.01); *C01P 2002/01* (2013.01); *C01P 2002/76* (2013.01); *C01P 2004/03* (2013.01); *C01P 2006/40* (2013.01); *H01M 2004/028* (2013.01)

(56) References Cited

U.S. PATENT DOCUMENTS

| | | | |
|---|---|---|---|
| 11,165,060 B2 | 11/2021 | Sakai | |
| 2013/0108921 A1* | 5/2013 | Kase | C01G 53/50 429/211 |
| 2014/0087263 A1 | 3/2014 | Matsumoto et al. | |
| 2016/0043396 A1* | 2/2016 | Sakai | C01G 45/1228 429/223 |
| 2016/0276664 A1 | 9/2016 | Gunji et al. | |
| 2017/0062816 A1* | 3/2017 | Son | C01G 53/006 |

FOREIGN PATENT DOCUMENTS

| | | | |
|---|---|---|---|
| JP | 2011134670 A | 7/2011 | |
| JP | 2013140761 A | 7/2013 | |
| JP | 2013182782 A | 9/2013 | |
| JP | 2016033848 A | 3/2016 | |
| JP | 2016072179 A | 5/2016 | |
| JP | 2019091719 A | 6/2019 | |
| KR | 20120099375 A | 9/2012 | |
| KR | 20140099218 A | 8/2014 | |
| KR | 1020160032246 A | 3/2016 | |
| KR | 1020190009299 A | 1/2019 | |
| KR | 20200038661 A | 4/2020 | |
| WO | 2012151297 A1 | 11/2012 | |

OTHER PUBLICATIONS

English translation of Matsumoto (JP 2016/139569) (Year: 2016).*
Office Action for corresponding Japanese Patent Application No. 2023-519296 dated Apr. 11, 2024 (6 pages).
Office Action for corresponding Japanese Patent Application No. 2023-519299 dated Apr. 11, 2024 (7 pages).
Office Action for corresponding Japanese Patent Application No. 2023-519412 dated Apr. 11, 2024 (7 pages).
Office Action for corresponding Korean Patent Application No. 10-2021-0067237 dated Aug. 11, 2023 (11 pages).
Office Action for corresponding Korean Patent Application No. 10-2021-0080132 dated Sep. 23, 2023 (11 pages).
Office Action for corresponding Korean Patent Application No. 10-2021-0080133 dated Sep. 23, 2023 (11 pages).
International Search Report for Corresponding PCT Application No. PCT/KR2021/018087 dated Mar. 18, 2022.
E.V. Makhonina et al., "Li-rich and Ni-rich transition metal oxides: Coating and core-shell structures", Applied Surface Science, Apr. 2019, pp. 25-33.
Mohammed Adnan Mezaal et al., "High energy density and lofty thermal stability nickel-rich materials for positive electrode of lithium ion batteries", J Solid State Electrochem, Mar. 2017.
Peng Bo Wang et al., "Comparative Investigation of 0.5Li2MnO3. 0.5LiNi0.5Co0.2Mn0.3O2 Cathode Materials Synthesized by Using Different Lithium Sources", Frontiers in Chemistry, May 2018.
European Search Report for corresponding Application No. 21901024.6 dated Nov. 25, 2024 (8 pages).
European Search Report for corresponding Application No. 21901026.1 dated Nov. 20, 2024 (8 pages).
European Search Report for corresponding Application No. 21901032.9 dated Nov. 25, 2024 (8 pages).
Japan Decision on Refusal for corresponding Application No. JP2023-519296 dated Dec. 20, 2024 (9 pages).
Japan Decision on Refusal for corresponding Application No. JP2023-519299 dated Dec. 20, 2024 (7 pages).
Japan Decision on Refusal for corresponding Application No. JP2023-519412 dated Dec. 20, 2024 (7 pages).

* cited by examiner

POSITIVE ELECTRODE ACTIVE MATERIAL FOR LITHIUM SECONDARY BATTERY, METHOD FOR PREPARING SAME, AND LITHIUM SECONDARY BATTERY INCLUDING SAME

CROSS-REFERENCE TO RELATED APPLICATIONS

This application is a U.S. National Stage Application under 35 U.S.C. § 371 of International Patent Application No. PCT/KR2021/018087, filed Dec. 2, 2021, which claims priority to Korean Patent Application No. 10-2020-0168858, filed Dec. 4, 2020, Korean Patent Application No. 10-2021-0067237, filed May 25, 2021, Korean Patent Application No. 10-2021-0080132, filed Jun. 21, 2021 and Korean Patent Application No. 10-2021-0080133, filed Jun. 21, 2021, the contents of which are each hereby incorporated by reference in their respective entireties.

TECHNICAL FIELD

The present disclosure relates to a cathode active material for a secondary battery, containing lithium composite oxide containing a layered structure of overlithiated oxide.

BACKGROUND ART

With the development of portable mobile electronic devices, such as a smartphone, an MP3 player, and a tablet PC, the demand for secondary batteries capable of storing electric energy is explosively increasing. In particular, with the advent of electric vehicles, medium and large energy storing systems, and portable devices requiring high energy density, the demand for lithium secondary batteries is increasing.

A material mostly favored recently as a cathode active material is a lithium-nickel-manganese-cobalt oxide, Li(Ni$_x$Co$_y$Mn$_z$)O$_2$ (herein, x, y, and z are each independently an atomic fraction of oxide-composition elements, and 0<x≤1, 0<y≤1, 0<z≤1, and 0<x+y+z≤1). This material has the advantage of high capacity since the material is used at a higher voltage than LiCoO$_2$ that has been actively studied and used as a cathode active material, and has the advantage of low price due to a relatively small Co content therein. However, this material has disadvantages of unsatisfactory rate capability and poor cycle life characteristics at high temperatures.

Hence, research has been conducted to apply overlithiated layered oxide, which exhibits higher reversible capacity than conventional Li(Ni$_x$Co$_y$Mn$_z$)O$_2$, to a lithium secondary battery.

However, there are problems of decreased discharge capacity (cycle life) and voltage decay during life cycling, which is due to phase transition from a spinel-like structure to a cubic structure due to transition metal migration during life cycling. These decreased discharge capacity (cycle life) and voltage decay are problems that must be solved in order to realize practical application to a lithium secondary battery.

DISCLOSURE OF INVENTION

Technical Problem

The present disclosure is intended to increase the charge/discharge capacity and solve the problems of life cycle deterioration and voltage decay by suppressing phase transition during life cycling in a cathode active material for a secondary battery.

Furthermore, the present disclosure is intended to increase the lithium ion mobility and improve the rate capability in a cathode active material for a secondary battery.

Furthermore, the present disclosure is intended to improve surface kinetic and structural stability of a cathode active material for a secondary battery.

Solution to Problem

The above problems are not solved by the following.

In accordance with an aspect of the present disclosure, there is provided a cathode active material for a secondary battery, including a lithium composite oxide represented by Formula 1 below and containing a layered structure of overlithiated oxide, wherein the lithium composite oxide includes a secondary particle, the secondary particle includes at least one primary particle, and the primary particle includes at least one crystallite, at least one selected from the secondary particle, the primary particle, and the crystallite includes a core and a shell occupying at least a part of the surface of the core, and when a crystal structure assigned to a space group C2/m is defined as [C2/m], a crystal structure assigned to a space group R-3m is defined as [R-3m], and the ratio of the crystal structure assigned to the space group C2/m to the crystal structure assigned to the space group R-3m is defined as [C2/m]/[R-3m], the [C2/m]/[R-3m] in the core is different than in the shell of the secondary particle:

$$rLi_2M1O_3 \cdot (1-r)Li_aM2O_2 \quad \text{[Formula 1]}$$

where, 0<r<1 and 0<a≤1; M1 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi; and M2 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi.

The [C2/m]/[R-3m] in the shell may be different than in the core of the primary particle.

The [C2/m]/[R-3m] in the shell may be different than in the core of the crystallite.

As a more preferable example, in each of at least one selected from the secondary particle, the primary particle, and the crystallite, the [C2/m]/[R-3m] may be greater in the core than in the shell.

In addition, when the ratio of the crystal structure assigned to the space group C2/m to the crystal structure assigned to the space group C2/m or R-3m is defined as [C2/m]/[C2/m+R-3m], at least one selected from the secondary particle, the primary particle, and the crystallite may include a phase gradient portion in which the [C2/m]/[C2/m+R-3m] has a gradient toward the center from the surface of the selected at least one.

At least one selected from the secondary particle, the primary particle, and the crystallite may include a phase gradient portion in which the [C2/m]/[C2/m+R-3m] increases toward the center.

[C2/m] and [R-3m] may present in a mixed state in the core of the selected at least one.

The shell of at least one selected from the secondary particle, the primary particle, and the crystallite may have a crystal structure assigned to the space group R-3m.

In the lithium composite oxide, the [C2/m]/[R-3m] may be not greater than 1.

The cathode active material may contain cobalt (Co) or contain no cobalt (Co).

In accordance with another aspect of the present disclosure, there is provided a secondary battery, including the cathode active material.

Advantageous Effects of Invention

In the cathode active material for a secondary battery according to the present disclosure, the phase transition during life cycling is suppressed to increase the charge/discharge capacity and solve the problems of life cycle deterioration and voltage decay.

Furthermore, the cathode active material for a secondary battery according to the present disclosure has increased lithium ion mobility and improved rate capability.

Furthermore, the cathode active material for a secondary battery according to the present disclosure has improved surface kinetic and structural stability.

MODE FOR CARRYING OUT THE INVENTION

Figure 1:
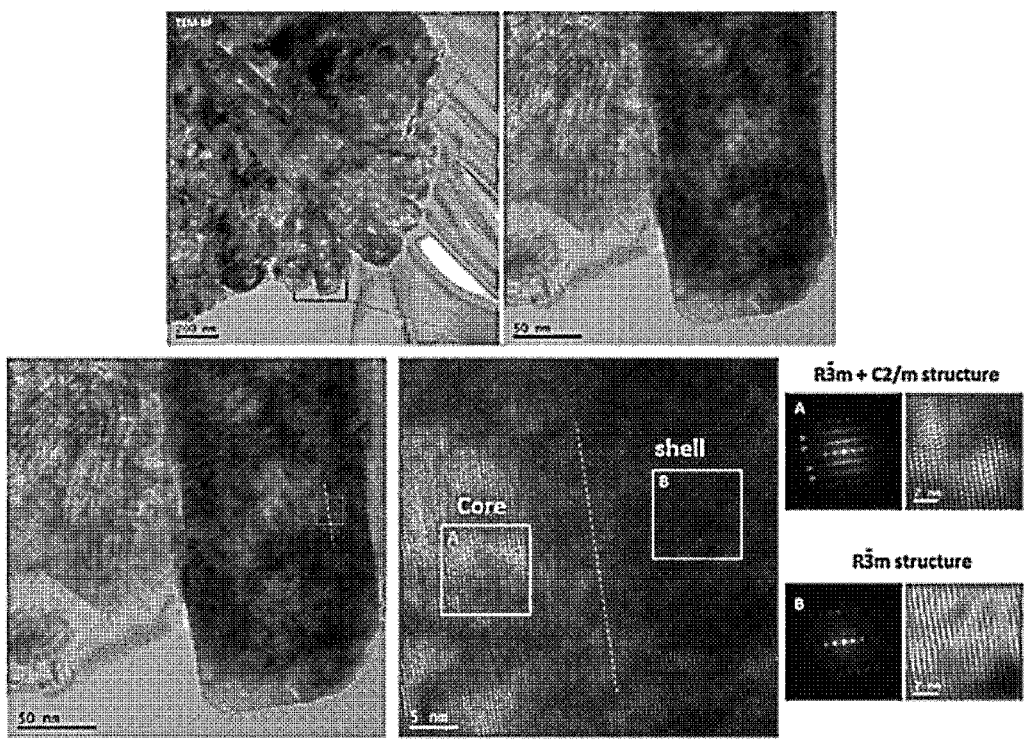
FIG. 1 shows HR-TEM-FFT analysis results of Example 1.

As used herein, terms such as "comprising" should be understood as open-ended terms that do not preclude the inclusion of other technical features.

As used herein, the terms "as an example", "as an example", and "preferably" refer to embodiments of the present disclosure that may afford certain benefits, under certain circumstances, and are not intended to exclude other embodiments from the scope of the disclosure.

As used herein, the term "as a preferable example" refers to a preferable embodiment as a means for technical problems to be solved by the present disclosure, that is, effects of suppressing phase transition, increasing charge and discharge capacity, solving life cycle deterioration and voltage decay, increasing lithium mobility, and improving rate capability and structural stability.

A cathode active material for a secondary battery according to an embodiment of the present disclosure contains a lithium composite oxide represented by Formula 1 below and containing a layered structure of overlithiated oxide.

$$rLi_2M1O_3 \cdot (1-r)Li_aM2O_2 \quad \text{[Formula 1]}$$

In Formula 1, $0<r<1$ and $0<a\leq1$; M1 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi; and M2 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi.

As a preferable example, M1 is at least one selected from Mn, Cr, Fe, Co, Ni, Mo, Ru, W, Ti, Zr, Sn, V, Al, Mg, Ta, B, P, Nb, Cu, La, Ba, Sr, and Ce; and M2 is at least one selected from Ni, Co, Mn, Cr, Fe, Mo, Ru, W, Ti, Zr, Sn, V, Al, Mg, Ta, B, P, Nb, Cu, La, Ba, Sr, and Ce.

As an example, in Formula 1, the overlithiated oxide may be a solid solution phase in which monoclinic-structured $Li_2M1O_3$ and rhombohedral-structured $Li_aM2O_2$ are present in a mixed state.

As a more preferable example, the average valence of M1 may be 3.5 to 4.5 or may be 4.

As a more preferable example, the average valence of M2 may be 2.5 to 3.5 or may be 3.

As a preferable example, Formula 1 may be expressed as Formula 1-1 below.

$$rLi_2Mn_pMd1_{1-p}O_3 \cdot (1-r)Li_aNi_xCo_yMn_zMd2_{1-(x+y+z)}O_2 \quad \text{[Formula 1-1]}$$

In Formula 1-1, $0<r<1$, $0<p\leq1$, $0<a\leq1$, $0\leq x\leq1$, $0\leq y\leq1$, $0\leq z\leq1$, and $0<x+y+z\leq1$; Md1 and Md2 are each independent; Md1 is at least one selected from Mo, Nb, Fe, Cr, V, Co, Cu, Zn, Sn, Mg, Ni, Ru, Al, Ti, Zr, B, Na, K, Y, P, Ba, Sr, La, Ga, Gd, Sm, W, Ca, Ce, Ta, Sc, In, S, Ge, Si, and Bi; and Md2 is at least one selected from Mo, Nb, Fe, Cr, V, Cu, Zn, Sn, Mg, Ru, Al, Ti, Zr, B, Na, K, Y, P, Ba, Sr, La, Ga, Gd, Sm, W, Ca, Ce, Ta, Sc, In, S, Ge, Si, and Bi.

Md1 and Md2 may be each independently an element, a dopant, or a coating material, and desired effects of the present disclosure can be obtained regardless of the types of Md1 and Md2.

As a more preferable example, Md1 is at least one selected from Cr, Fe, Co, Ni, Mo, Ru, W, Ti, Zr, Sn, V, Al, Mg, Ta, B, P, Nb, Cu, La, Ba, Sr, and Ce; and Md2 is at least one selected from Cr, Fe, Mo, Ru, W, Ti, Zr, Sn, V, Al, Mg, Ta, B, P, Nb, Cu, La, Ba, Sr, and Ce.

As an example, in Formula 1-1, the overlithiated oxide may be a solid solution phase in which monoclinic-structured $Li_2Mn_pMd1_{1-p}O_3$ and rhombohedral-structured $Li_aNi_xCo_yMn_zMd_{1-(x+y+z)}O_2$ are present in a mixed state.

As an example, the overlithiated oxide may have a layered structure in which a lithium atomic layer alternately overlaps an atomic layer of nickel, cobalt, manganese, or Md via an oxygen atomic layer interposed therebetween.

As an example, r may be not greater than 1, not greater than 0.9, not greater than 0.8, not greater than 0.7, or not greater than 0.6.

As an example, p may be greater than 0, may be not smaller than 0.1, 0.2, 0.3, 0.4, 0.5, 0.6, 0.7, 0.8, or 0.9, or may be 1.0.

As a more preferable example, in the lithium composite oxide of the present disclosure, the number of moles of lithium to the total number of moles of M1 and M2, Li/M, may be not lower than 1.01, 1.05, or 1.1 and may be not higher than 1.7, 1.6, 1.5, 1.4, or 1.3.

As a more preferable example, in the lithium composite oxide, the number of moles of lithium (Li) to the total number of moles of M1 and M2, Li/M, may be not lower than 0.1, 0.2, or 0.3 and may be not higher than 0.7, 0.6, or 0.5.

As a more preferable example, in the lithium composite oxide, the number of moles of cobalt. (Co) to the total number of moles of M1 and M2, Co/M, may be not lower than 0.0, 0.05, or 0.1 and may be not higher than 0.3, 0.2, or 0.1.

As a more preferable, a cathode active material according to an embodiment of the present disclosure may not contain Co.

As a more preferable example, in the lithium composite oxide, the number of moles of manganese (Mn) to the total number of moles of M1 and M2, Mn/M, may be not lower than 0.1, 0.2, or 0.3 and may be not higher than 0.8 or 0.7.

As a more preferable example, in the lithium composite oxide, the number of moles of Md2 to the total number of moles of M1 and M2, Md2/M, may be not lower than 0.0 and may be not higher than 0.2 or 0.1.

The lithium composite oxide includes a secondary particle, the secondary particle includes at least one primary particle, and the primary particle includes at least one crystallite.

As used herein, "at least one" refers to one or two or more.

As an example, the secondary particle may include one primary particle and may be formed by aggregation of two or more primary particles.

As an example, the primary particle may include one crystallite or may be formed by aggregation of two or more crystallites.

In the cathode active material according to an embodiment of the present disclosure, at least one selected from the secondary particle, the primary particle, and the crystallite includes a core and a shell occupying at least a part of the surface of the core.

As an example, the secondary particle may be a particle having a core-shell structure including a core and a shell occupying at least a part of the surface of the core.

In particular, the "at least a part" may mean being more than 0%, or not less than 10%, 20%, 30%, 40%, 50%, 60%, 70%, 80%, or 90% of the total surface area of the secondary particle.

The average diameter (D50) of the secondary particle may be 0.5 to 20 μm.

As an example, the thickness of the shell of the secondary particle may be more than 0 and not more than 10 μm, more than 0 and not more than 1 μm, more than 0 and not more than 500 nm, more than 0 and not more than 400 nm, more than 0 and not more than 300 nm, more than 0 and not more than 200 nm, more than 0 and not more than 150 nm, more than 0 and not more than 100 nm, more than 0 and not more than 90 nm, more than 0 and not more than 80 nm, more than 0 and not more than 70 nm, more than 0 and not more than 60 nm, or more than 0 and not more than 50 nm.

As an example, the thickness of the shell of the secondary particle may be more than 0.0% or not less than 1, 10, 20, 30, 40, 50, 60, 70, 80, or 90% and may be less than 100% or not more than 90, 80, 70, 60, 50, 40, 30, 20, 10, or 1%.

As an example, the primary particle may include a core and a shell occupying at least a part of the surface of the core.

In particular, the "at least a part" may mean being more than 0% or not less than 10%, 20%, 30%, 40%, 50%, 60%, 70%, 80%, or 90% of the total surface area of the primary particle.

As an example, the thickness of the shell of the primary particle may be more than 0 and not more than 10 μm, more than 0 and not more than 1 μm, more than 0 and not more than 500 nm, more than 0 and not more than 400 nm, more than 0 and not more than 300 nm, more than 0 and not more than 200 nm, more than 0 and not more than 150 nm, more than 0 and not more than 100 nm, more than 0 and not more than 90 nm, more than 0 and not more than 80 nm, more than 0 and not more than 70 nm, more than 0 and not more than 60 nm, or more than 0 and not more than 50 nm.

As an example, the thickness of the shell of the primary particle may be more than 0.0% or not less than 1, 10, 20, 30, 40, 50, 60, 70, 80, or 90% and may be less than 100% or not more than 90, 80, 70, 60, 50, 40, 30, 20, 10, or 1%.

As an example, the crystallite may include a core and a shell occupying at least a part of the surface of the core.

In particular, the "at least a part" may mean being more than 0% or not less than 10%, 20%, 30%, 40%, 50%, 60%, 70%, 80%, or 90% of the total surface area of the crystallite.

As an example, the thickness of the shell of the crystallite may be more than 0 and not more than 10 μm, more than 0 and not more than 1 μm, more than 0 and not more than 500 nm, more than 0 and not more than 400 nm, more than 0 and not more than 300 nm, more than 0 and not more than 200 nm, more than 0 and not more than 150 nm, more than 0 and not more than 100 nm, more than 0 and not more than 90 nm, more than 0 and not more than 80 nm, more than 0 and not more than 70 nm, more than 0 and not more than 60 nm, or more than 0 and not more than 50 nm.

As an example, the thickness of the shell of the crystallite may be more than 0.0% or not less than 1, 10, 20, 30, 40, 50, 60, 70, 80, or 90% and may be less than 100% or not more than 90, 80, 70, 60, 50, 40, 30, 20, 10, or 1%.

The "core" of the secondary particle, the primary particle, or the crystallite means a region that is present inside the secondary particle, the primary particle, or the crystallite and is close to the center of the particle excluding the surface of the particle.

The "shell" means a region that is close to the surface excluding the center of the particle or the inside of the particle.

In the cathode active material according to an embodiment of the present disclosure, a transition metal, such as nickel, cobalt, and/or manganese, may be diffused into the secondary particle, the primary particle, and/or the crystallite, to form the shell distinguished from the core.

In the present disclosure, a crystal structure assigned to a space group C2/m is defined as [C2/m], a crystal structure assigned to the space group R-3m is defined as [R-3m], and the ratio of the crystal structure assigned to the space group C2/m to the crystal structure assigned to the space group R-3m is defined as [C2/m]/[R-3m].

Figure 3:
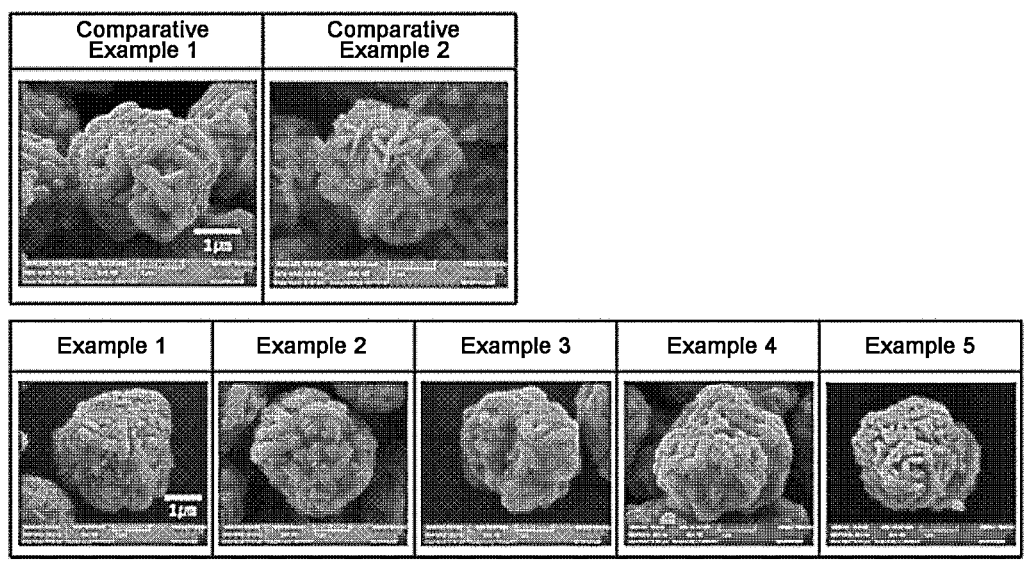
FIG. 3 shows SEM analysis results of comparative examples and examples

In the present disclosure, the space group R-3m has the same meaning as a space group marked as the sign "-" above the FIG. 3 instead of "-" between the letter R and the FIG. 3.

In the cathode active material for a secondary battery according to an embodiment of the present disclosure, the [C2/m]/[R-3m] in the core is different than in the shell of the secondary particle.

In the lithium composite oxide having the above-described composition according to the present disclosure, the [C2/m]+[R-3m] is differently controlled in the core and the shell of the secondary particle, so that the surface kinetic improvement can be attained to increase the lithium mobility in the surface and the irreversible reaction can be reduced in the particle surface to increase structural stability and efficiency.

This may mean that on the cross-section across the inside of the secondary particle, the [C2/m]/[R-3m] in the shell may be different than in the core of the secondary particle.

As a more preferable example, the [C2/m]/[R-3m] may be greater in the core than that in the shell of the secondary particle.

In the cathode active material for a secondary battery according to an embodiment of the present disclosure, the [C2/m]/[R-3m] in the shell may be different than in the core of the primary particle.

In the lithium composite oxide having the above-described composition of the present disclosure, the [C2/m]+[R-3m] is differently controlled in the core and the shell of the primary particle, so that the surface kinetic improvement can be attained to increase the lithium mobility in the surface and the irreversible reaction can be reduced in the particle surface to increase structural stability and efficiency.

This may mean that on the cross-section across the inside of the primary particle, the [C2/m]/[R-3m] in the shell may be different than in the core of the first particle.

In particular, the primary particle may be in contact with the surface of the secondary particle, or may include all of the primary particle present in the core of the secondary particle.

As a more preferable example, the [C2/m]/[R-3m] may be greater in the core than the shell of the primary particle.

In the cathode active material for a secondary battery according to an embodiment of the present disclosure, the [C2/m]/[R-3m] may be different in the shell and the core of the crystallite.

In the lithium composite oxide having the above-described composition of the present disclosure, the [C2/m]+[R-3m] is differently controlled in the core and the shell of the crystallite, so that the surface kinetic improvement can be attained to increase the lithium mobility in the surface and the irreversible reaction can be reduced in the particle surface to increase structural stability and efficiency.

This may mean that on the cross-section across the inside of the crystallite, the [C2/m]/[R-3m] in the shell may be different than in the core of the crystallite.

As a more preferable example, the [C2/m]/[R-3m] may be greater in the core than the shell of the crystallite.

As a more preferable example, when the ratio of the crystal structure assigned to the space group C2/m to the crystal structure assigned to the space group C2/m or R-3m is defined as [C2/m]/[C2/m+R-3m], the cathode active material for a secondary battery may include a phase gradient portion in which [C2/m]/[C2/m+R-3m] has a gradient toward the center from the surface of the secondary particle.

As a more preferable example, the cathode active material may include a phase gradient portion in which [C2/m]/[C2/m+R-3m] increases toward the center from the surface of the secondary particle.

As a more preferable example, when the ratio of the crystal structure assigned to the space group R-3m to the crystal structure assigned to the space group C2/m or R-3m is defined as [R-3m]/[C2/m+R-3m], the cathode active material for a secondary battery may include a phase gradient portion in which [R-3m]/[C2/m+R-3m] has a gradient toward the center from the surface of the secondary particle.

As a more preferable example, the cathode active material may include a phase gradient portion in which [R-3m]/[C2/m+R-3m] decreases toward the center from the surface of the secondary particle.

As a more preferable example, the cathode active material may include a phase gradient portion in which [C2/m]/[C2/m+R-3m] has a gradient toward the center from the surface of the primary particle.

As a more preferable example, the cathode active material may include a phase gradient portion in which [C2/m]/[C2/m+R-3m] increases toward the center from the surface of the primary particle.

As a more preferable example, the cathode active material may include a phase gradient portion in which [R-3m]/[C2/m+R-3m] has a gradient toward the center from the surface of the primary particle.

As a more preferable example, the cathode active material may include a phase gradient portion in which [R-3m]/[C2/m+R-3m] decreases toward the center from the surface of the primary particle.

As a more preferable example, the cathode active material may include a phase gradient portion in which [C2/m]/[C2/m+R-3m] has a gradient toward the center from the surface of the crystallite.

As a more preferable example, the cathode active material may include a phase gradient portion in which [C2/m]/[C2/m+R-3m] increases toward the center from the surface of the crystallite.

As a more preferable example, the cathode active material may include a phase gradient portion in which [R-3m]/[C2/m+R-3m] has a gradient toward the center from the surface of the crystallite.

As a more preferable example, the cathode active material may include a phase gradient portion in which [R-3m]/[C2/m+R-3m] decreases toward the center from the surface of the crystallite.

In particular, the phase gradient portion may mean including a phase gradient portion on the cross-section across the inside of each of the secondary particle, the primary particle, or the crystallite.

As a more preferable example, the core and/or shell of the secondary particle may include a crystal structure assigned to the space group R-3m and a crystal structure assigned to the space group C2/m.

As a more preferable example, the core and/or shell of the primary particle may include a crystal structure assigned to the space group R-3m and a crystal structure assigned to the space group C2/m.

As a more preferable example, the core and/or shell of the crystallite may include a crystal structure assigned to the space group R-3m and a crystal structure assigned to the space group C2/m.

As a still more preferable example, the shell of the secondary particle may have a crystal structure assigned to the space group R-3m.

As a still more preferable example, the shell of the primary particle may have a crystal structure assigned to the space group R-3m.

As a still more preferable example, the shell of the crystallite may have a crystal structure assigned to the space group R-3m.

In the lithium composite oxide, the [C2/m]/[R-3m] may be not greater than 1.

As a more preferable example, the cathode active material may contain cobalt (Co).

As a still more preferable example, the cathode active material may not contain cobalt (Co). In particular, by controlling the phases of the core and the shell in the secondary particle, the primary particle, or the crystallite while not using expensive cobalt, the charge and discharge capacity can be increased and the problems of life cycle deterioration and voltage decay can be solved.

The cathode active material according to an embodiment of the present disclosure may further include a separate coating layer. The coating layer may contain at least one coating material selected from P, Nb, Si, Sn, Al, Pr, Al, Ti, Zr, Fe, Al, Fe, Co, Ca, Mn, Ti, Sm, Zr, Fe, La, Ce, Pr, Mg, Bi, Li, W, Co, Zr, B, Ba, F, K, Na, V, Ge, Ga, As, Sr, Y, Ta, Cr, Mo, W, Mn, Ir, Ni, Zn, In, Na, K, Rb, Cs, Fr, Sc, Cu, Ru, Rh, Pd, Ag, Cd, Sb, Hf, Ta, Re, Os, Pt, Au, Pb, Bi, and Po, but is not particularly limited thereto.

The coating layer blocks the contact between the cathode active material and an electrolyte included in the lithium secondary battery to suppress the occurrence of side reactions, thereby improving the life cycle and increasing packing density. In some embodiments, the coating layer can act as a lithium ion conductor.

The coating layer may be formed on the entire surface of the cathode active material or the entire surface of the primary particle, or may be partially formed thereon.

In addition, the coating layer may be in a single-layer coating, double-layer coating, grain boundary coating, uniform coating, or island coating form.

In the cathode active material according to an embodiment of the present disclosure, a lithium ion diffusion path may be formed inside the primary particle.

In the cathode active material according to an embodiment, a surface that constitutes a layer of the layered structure may have crystal orientation in a direction perpendicular to a C-axis inside the primary particle, and the lithium ion diffusion path may be formed inside or outside the primary particle in a direction toward the center of the particle of the cathode active material.

As a more preferable example, the secondary particle may include a concentration gradient portion in which at least one element selected from nickel (Ni), cobalt (Co), and manganese (Mn) has a concentration gradient.

As a more preferable example, the primary particle may include a concentration gradient portion in which at least one element selected from nickel (Ni), cobalt (Co), and manganese (Mn) has a concentration gradient.

As a more preferable example, the crystallite may include a concentration gradient portion in which at least one element selected from nickel (Ni), cobalt (Co), and manganese (Mn) has a concentration gradient.

As a more preferable example, when the number of moles of nickel (Ni) to the total number of moles of M1 and M2 in Formula 1 is defined as Ni/M, the Ni/M may be higher in the shell than in the core in at least one selected from the secondary particle, the primary particle, and the crystallite.

As a more preferable example, when the number of moles of cobalt (Co) to the total number of moles of M1 and M2 in Formula 1 is defined as Co/M, the Co/M may be higher in the shell than in the core in at least one selected from the secondary particle, the primary particle, and the crystallite.

As a more preferable example, when the number of moles of manganese (Mn) to the total number of moles of M1 and M2 in Formula 1 is defined as Mn/M, the Mn/M may be lower in the shell than the core in at least one selected from the secondary particle, the primary particle, and the crystallite.

As a more preferable example, Mn/M>Ni/M>Co/M may be satisfied in the core of the secondary particle, the primary particle, and/or the crystallite.

As a more preferable example, the Ni/M may be not lower than 0.1, 0.2, or 0.3 and may be not higher than 1.0, 0.9, or 0.8 in the core of the secondary particle, the primary particle, and/or the crystallite.

As a more preferable example, the Co/M may be not higher than 0.3, 0.2, 0.1, or 0.05 and may be not lower than 0.0 in the core of the secondary particle, the primary particle, and/or the crystallite.

As a more preferable example, the Mn/M may be not lower than 0.4, 0.5, or 0.6 and may be not higher than 1.0, 0.9, or 0.8 in the core of the secondary particle, the primary particle; and/or the crystallite.

As a more preferable example of the present invention, the maximum Ni/M may be not less than 5, 10, 15, 20, 25, 30, 35, 40, 45, 50, 55, 60, 65, 70, 75, 80, 85, 90, or 95 mol % and may be not more than 100, 95, 90, 85, 80, 75, 70, 65, 60, 55, 50, 45, 40, 35, 30, 25, 20, 15, or 10 mol % in the shell of the secondary particle, the primary particle, and/or the crystallite.

As a more preferable example of the present invention, the maximum Co/M may be not less than 1, 3, 5, 10, 15, 20, 25, 30, 35, 40, 45, 50, 55, 60, 65, 70, 75, 80, 85, 90, or 95 mol % and may be not more than 100, 95, 90, 85, 80, 75, 70, 65, 60, 55, 50, 45, 40, 35, 30, 25, 20, 15, or 10 mol % in the shell of the secondary particle, the primary particle, and/or the crystallite.

As a more preferable example of the present invention, the minimum Mn/M may be not less than 5, 10, 15, 20, 25, 30, 35, 40, 45, 50, 55, 60, 65, 70, 75, 80, 0.85, 90, or 95 mol % and may be not more than 100, 95, 90, 85, 80, 75, 70, 65, 60, 55, 50, 45, 40, 35, 30, 25, 20, 15, or 10 mol % in the shell of the secondary particle, the primary particle, and/or the crystallite.

Hereinafter, a method for preparing a cathode active material for a secondary battery according to an embodiment of the present disclosure will be described in detail.

First, a step of forming precursor particles is performed.

As a more preferable example, the precursor particles may be manufactured by co-precipitation, and a complexing agent may be added for the manufacturing.

Then, a step of subjecting the formed precursor particles to first thermal treatment at 300 to 1000° C. followed by cooling is performed.

Then, a step of, after the first thermal treatment and then cooling, subjecting the precursor particles to wet coating with a compound containing at least one element selected from cobalt, nickel, and manganese may be performed.

Then, a step of mixing a first lithium compound with the first thermally treated and then cooled particles or the wet-coated particles and subjecting the mixture to second thermal treatment at 800 to 1000° C., followed by cooling is performed.

Then, a step of, after the second thermal treatment and then cooling, subjecting the precursor particles to wet coating with a compound containing at least one element selected from cobalt, nickel, and manganese may be performed.

Then, a step of mixing a second lithium compound with the second thermally treated and then cooled particles or the wet-coated particles and subjecting the mixture- to third thermal treatment at 300 to 1000° C., followed by cooling is performed.

An embodiment of the present disclosure may include a step of subjecting the precursor particles to wet coating with a compound containing at least one element selected from cobalt, nickel, and manganese, after the step of forming the precursor particles before the step of first thermal treatment followed by cooling, between the step of first thermal treatment followed by cooling and the step of second thermal treatment followed by cooling, and between the step of second thermal treatment followed by cooling and the step of third thermal treatment followed by cooling.

As a more preferable example, in the step of wet coating, co-precipitation may be performed, and a complexing agent may be added.

A secondary battery according to an embodiment of the present disclosure includes the cathode active material.

The cathode active material is as described above, and a binder, a conductor, and a solvent are not particularly limited as long as these can be used on a cathode current collector for a secondary battery.

The lithium secondary battery may specifically include a cathode, an anode disposed to face the cathode, and an electrolyte between the cathode and the anode, and any battery that can be used as a secondary battery is not particularly limited thereto.

Hereinafter, cathode active materials according to examples of the present disclosure are specifically described.

Examples 1 to 5

Preparation of Precursor

A spherical $Ni_xCo_yMn_z(OH)$ precursor was synthesized using co-precipitation. In a 90-L reactor, 25 wt % of NaOH and 28 wt % of NH4OH were added to an aqueous solution of 2.5 M complex transition-metal sulfates prepared by mixing $NiSO_4 \cdot 6H_2O$, $MnSO_4 \cdot H_2O$, and $CoSO_4 \cdot 7H_2O$ while the mole ratio of Ni:Co:Mn was adjusted. The pH in the reactor was maintained at 9.0-12.0, and the temperature in the reactor was maintained at 45 to 50° C. In addition, $N_2$, an inert gas, was injected into the reactor to prevent the oxidation of the prepared precursor. After the completion of synthesis and stirring, washing and dehydration were performed using a filter press (F/P). Finally, the dehydrated product was dried at 120° C. for 2 days, and filtered through a 75-μm (200 mesh) sieve to obtain a $Ni_xCo_yMn_z(OH)$ precursor of 4 μm.

First Thermal Treatment and Cooling

The precursor was maintained in an $O_2$ or air (50 L/min) atmosphere in a box furnace while the temperature was elevated at a rate of 2° C. per min and maintained at 300 to 1000° C. for 1-10 hours, followed by furnace cooling.

Wet Coating (if Performed after the First Thermal Treatment and Cooling)

The precursor was wet-coated using co-precipitation. In a reactor in which the precursor was stirred, an aqueous solution of complex transition-metal sulfates, which was prepared by mixing $CoSO_4 \cdot 7H_2O$, $NiSO_4 \cdot 6H_2O$, or $MnSO_4 \cdot H_2O$ with an adjusted molar ratio and distilled water, 25 wt % of NaOH, and 28 wt % of $NH_4OH$ were added. The coating amount of the transition metal was 1-10 mol % relative to the total number of moles of nickel (Ni), cobalt (Co), and manganese (Mn), and the pH in the reactor was maintained at 9.0-12.0. After the completion of synthesis and stirring, washing and dehydration were performed using a filter press (F/P). Finally, the dehydrated product was dried at 150° C. for 14 hours to obtain a precursor having a concentration gradient.

Second Thermal Treatment and Cooling

The precursor was mixed with LiOH or $Li_2CO_3$, which was weighed with an adjusted Li/M ratio, by using a manual mixer (MM). The mixture was maintained in an $O_2$ or air (50 L/min) atmosphere in a Box furnace while the temperature was elevated at a rate of 2° C. per min and maintained at 800 to 1000° C. for 7-12 hours, followed by furnace cooling.

Wet Coating (if Performed after the Second Thermal Treatment and Cooling)

The lithium composite oxide was wet-coated using co-precipitation. In a reactor in which the particles were stirred, an aqueous solution of complex transition-metal sulfates, which was prepared by mixing $CoSO_4 \cdot 7H_2O$, $NiSO_4 \cdot 6H_2O$, or $MnSO_4 \cdot H_2O$ with an adjusted molar ratio and distilled water, 25 wt % of NaOH, and 28 wt % of $NH_4OH$ were added. The coating amount of the transition metal was 1-10 mol % relative to the total number of moles of nickel (Ni), cobalt (Co), and manganese (Mn), and the pH in the reactor was maintained at 9.0-12.0. After the completion of synthesis and stirring, washing and dehydration were performed using a filter press (F/P). Finally, the dehydrated product was dried at 150° C. for 14 hours to obtain a lithium composite oxide having a concentration gradient.

Third Thermal Treatment and Cooling

The coated product was mixed with LiOH or $Li_2CO_3$, which was weighed with an adjusted Li/M ratio, by using a manual mixer (MM). The mixture was maintained in an $O_2$ or air atmosphere in a box furnace while the temperature was elevated at a rate of 4.4° C. per min and maintained at 300 to 1000° C. for 7-12 hours, followed by furnace cooling.

Comparative Examples 1 and 2

Each cathode active material was prepared by the same method as in Examples 1 to 5 except that a step of wet coating with a transition metal as in the manufacturing of Examples 1 to 5 was not performed.

Table 1 below relates to the manufacturing methods of Examples 1 to 5 and Comparative Examples 1 to 2.

<Manufacturing Example> Manufacturing of Lithium Secondary Battery

Cathode slurries were prepared by dispersion of 90 wt % of the cathode active materials of the examples and comparative examples, 5.5 wt % of carbon black, and 4.5 wt % of a PVDF binder in 30 g of N-methyl-2 pyrrolidone (NMP). Each of the cathode slurries was applied to a 15 μm-thick aluminum (Al) thin film as a cathode current collector, dried, and then roll-pressed to manufacture a cathode.

For the cathode, metallic lithium was used as a counter electrode, and 1.15 M LiPF6 in EC/DMC/EMC=2/4/4 (vol %) was used as an electrolyte.

A separator formed of a porous polyethylene. (PE) film was interposed between the cathode and the anode to form a battery assembly, and the electrolyte was injected into the battery assembly to manufacture a lithium secondary battery (coin cell)

Experimental Example 1

Table 2 below relates to characteristics of lithium secondary batteries of the examples and comparative examples.

Figure 2:
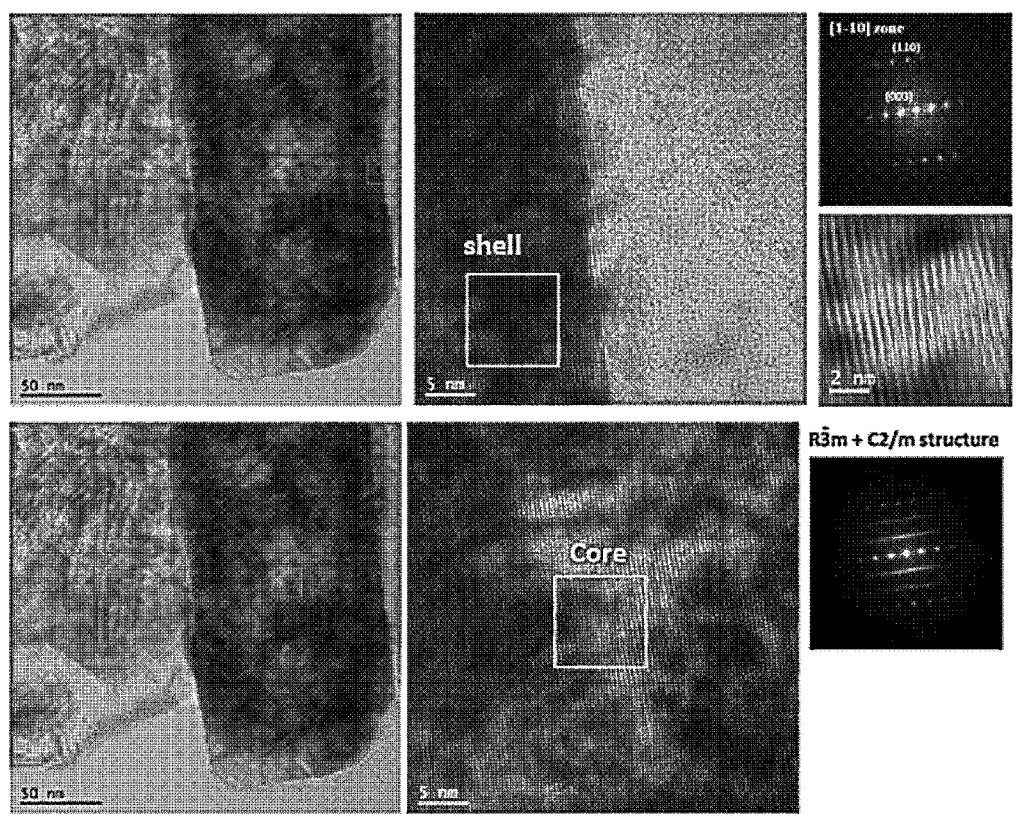
FIG. 2 shows HR-TEM-FFT analysis results of Example 1.

The HR-TEM-FFT analysis results of FIGS. 1 to 2 can confirm the phase of the cathode active material of an example.

FIG. 3 shows SEM analysis results of the comparative examples and the examples.

Figure 4:
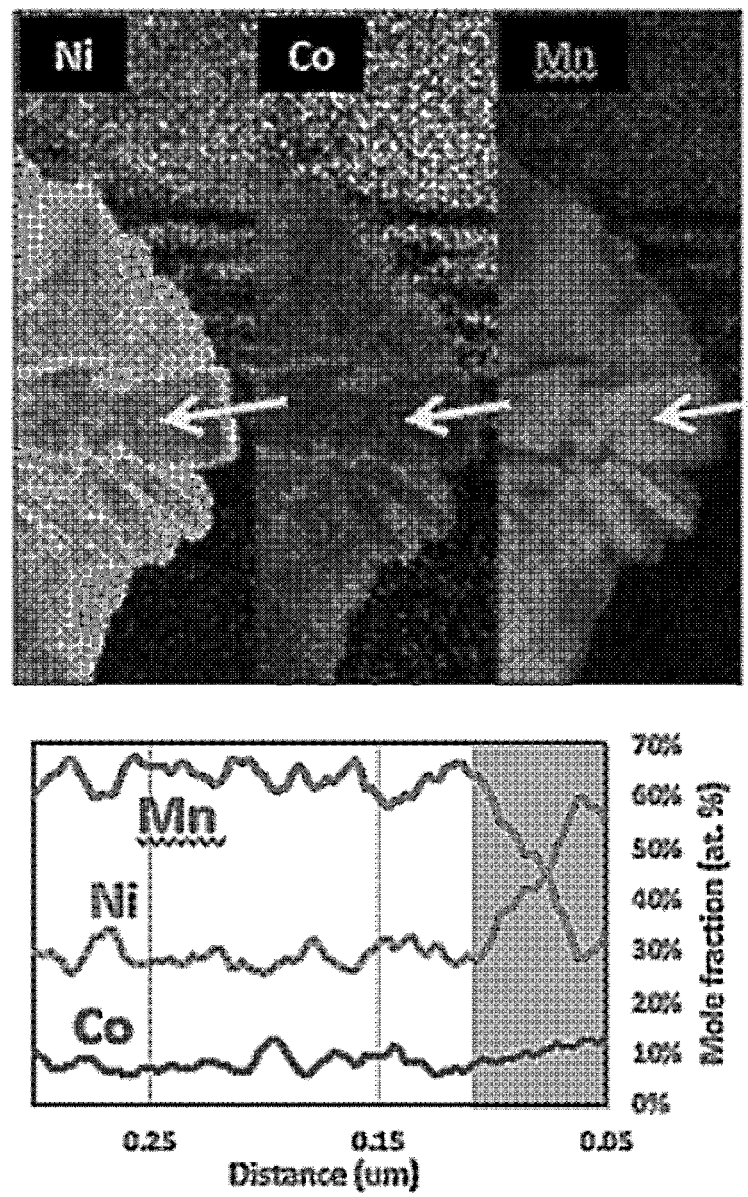
FIG. 4 shows TEM-EDS and concentration gradient analysis results of Example 1.
Figure 5:
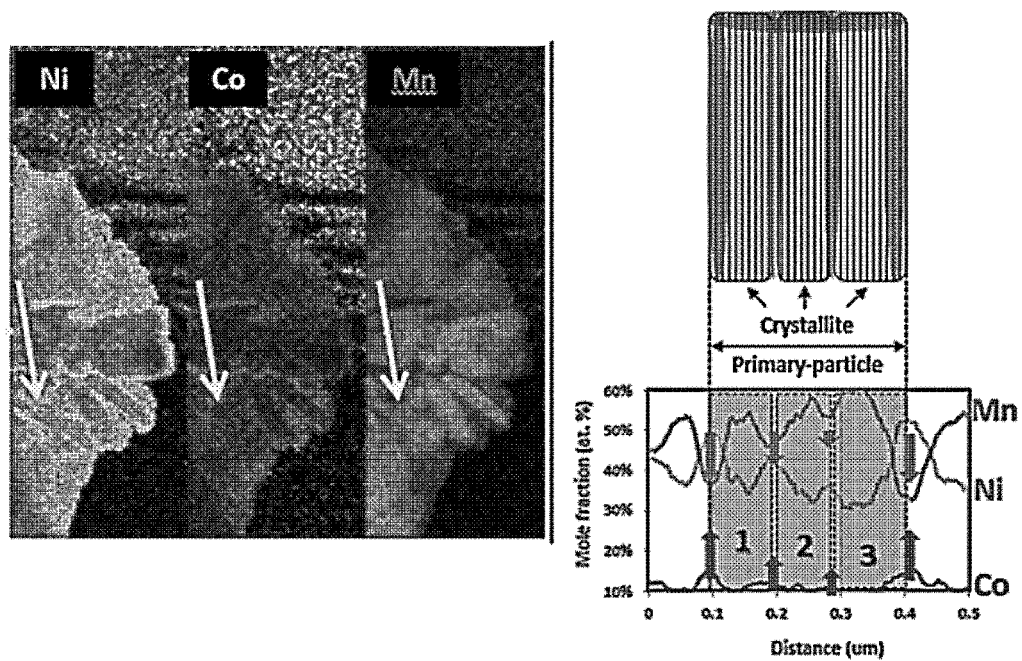
FIG. 5 shows TEM-EDS and concentration gradient analysis results of Example 1.
Figure 6:
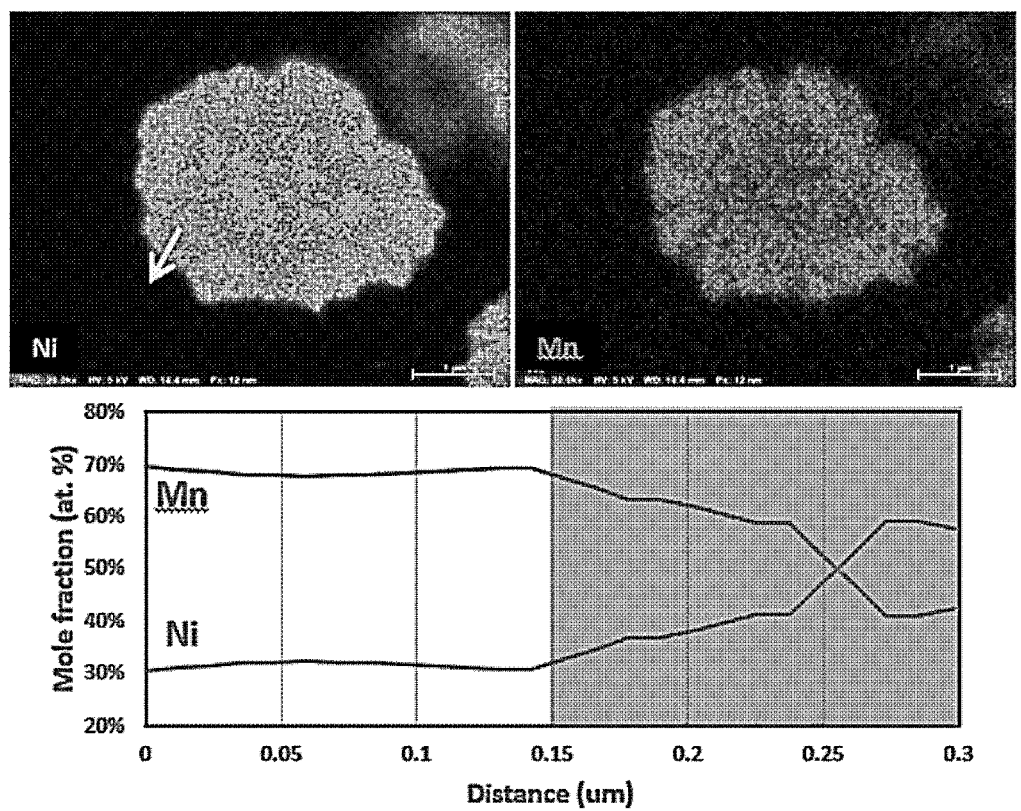
FIG. 6 shows TEM-EDS and concentration gradient analysis results of Example 5.

The TEM-EDS analysis results of FIGS. 4 to 6 can confirm metal concentration gradients in the cathode active materials of the examples.

Figure 7:
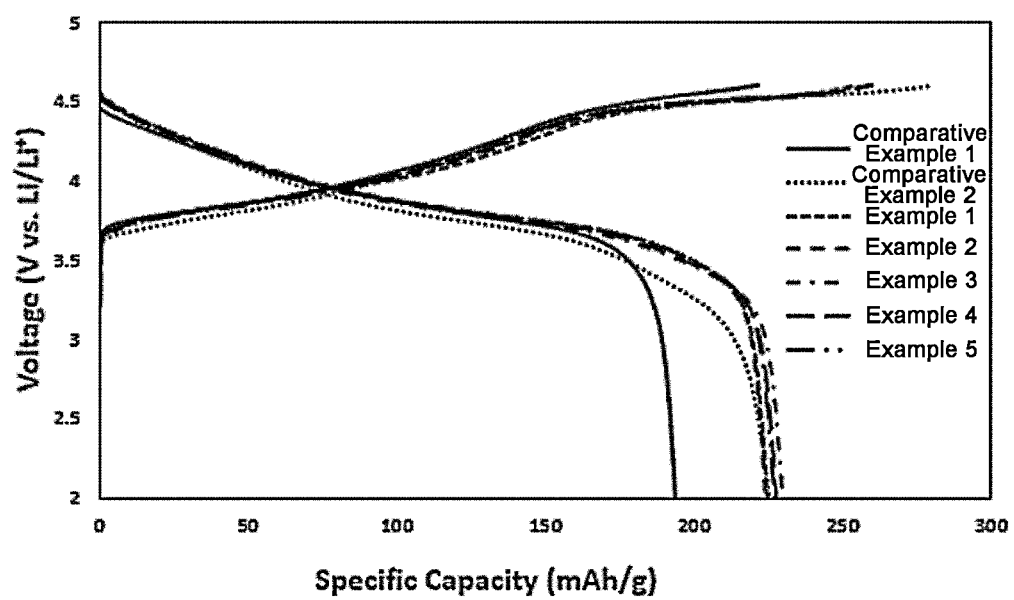
FIG. 7 shows initial voltage profile analysis results of the comparative examples and examples.

FIG. 7 and Table 2 can confirm that the examples showed increased charge/discharge capacity and efficiency compared with the comparative examples. This is due to the results of increasing the lithium mobility in the surface by surface kinetic improvement, through a phase difference of C2/m and R-3m in the core and the shell.

Figure 8:
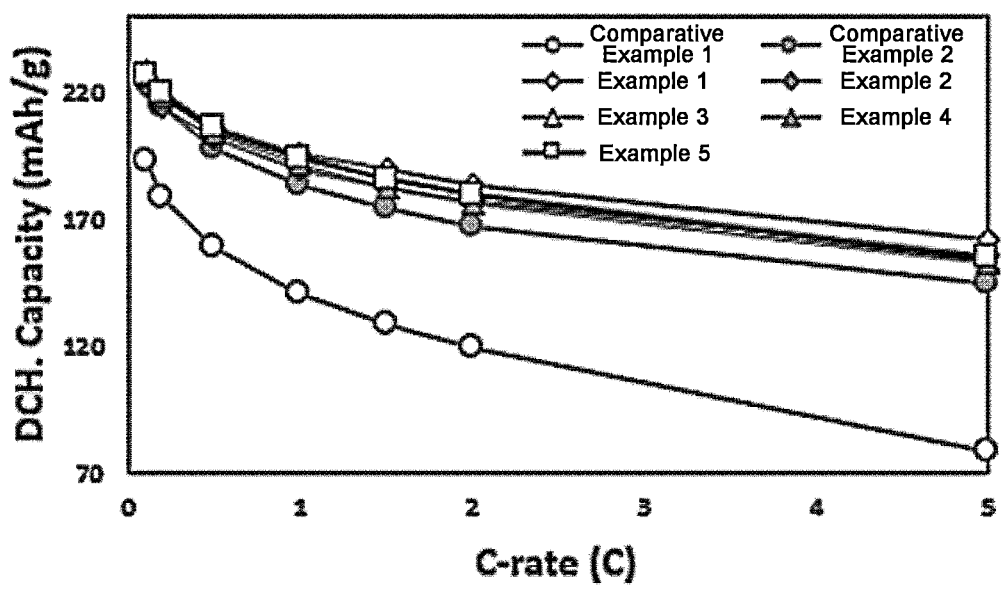
FIG. 8 shows rate capability analysis results of the comparative examples and the examples.
Figure 9:
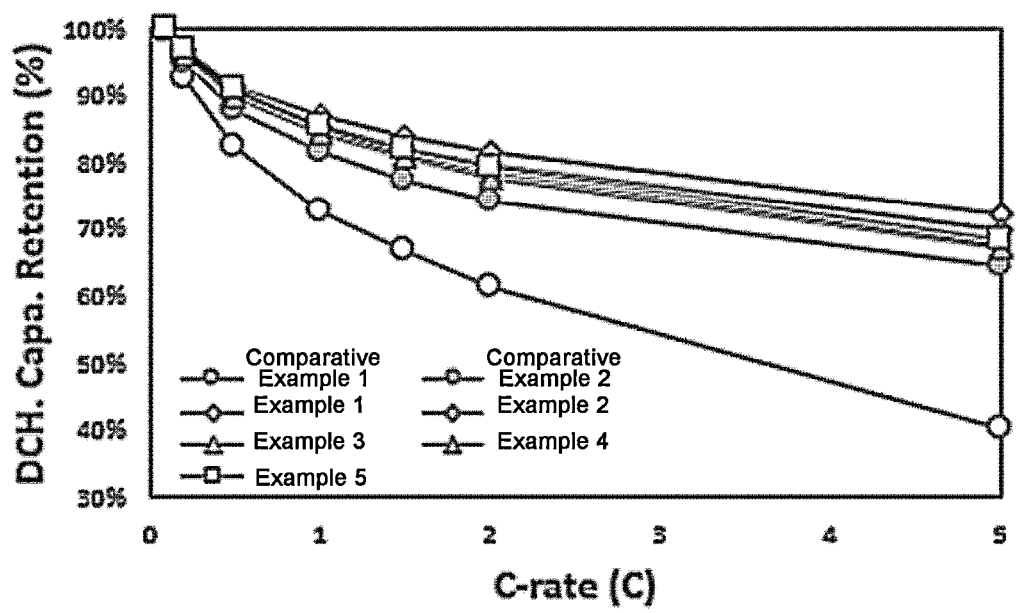
FIG. 9 shows rate capability analysis results of the comparative examples and the examples.

FIGS. 8 and 9 and Table 2 can confirm that the examples showed improved rate capability compared with the comparative examples. This is due to the results of reducing an irreversible reaction in the particle surface to increase efficiency by allowing the crystal structure in the surface to be further assigned to the crystal structure of the space group R-3m, through a phase difference of C2/m and R-3m in the core and the shell.

Figure 10:
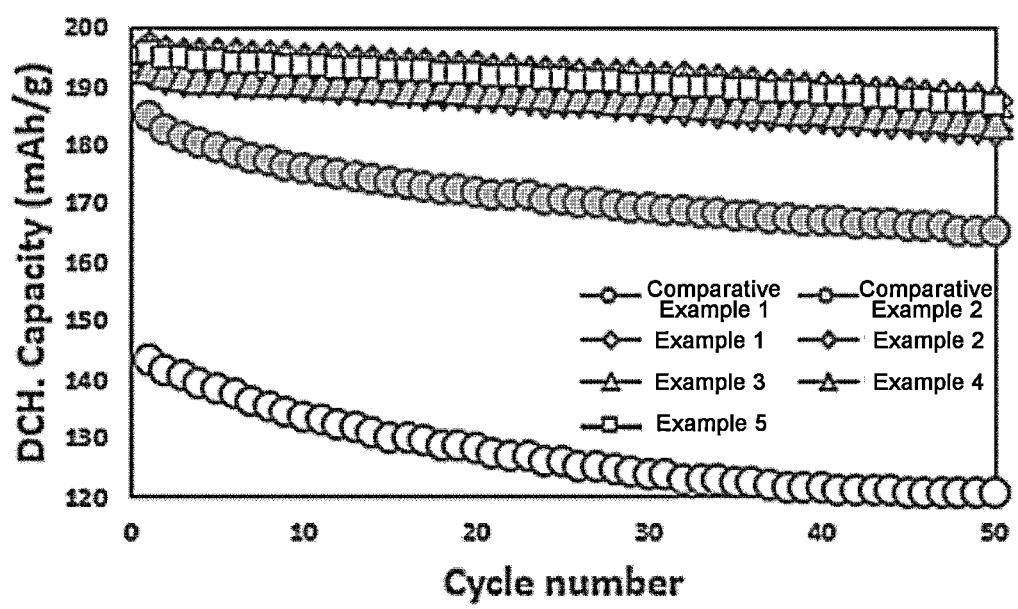
FIG. 10 shows life cycle analysis results of the comparative examples and the examples.
Figure 11:
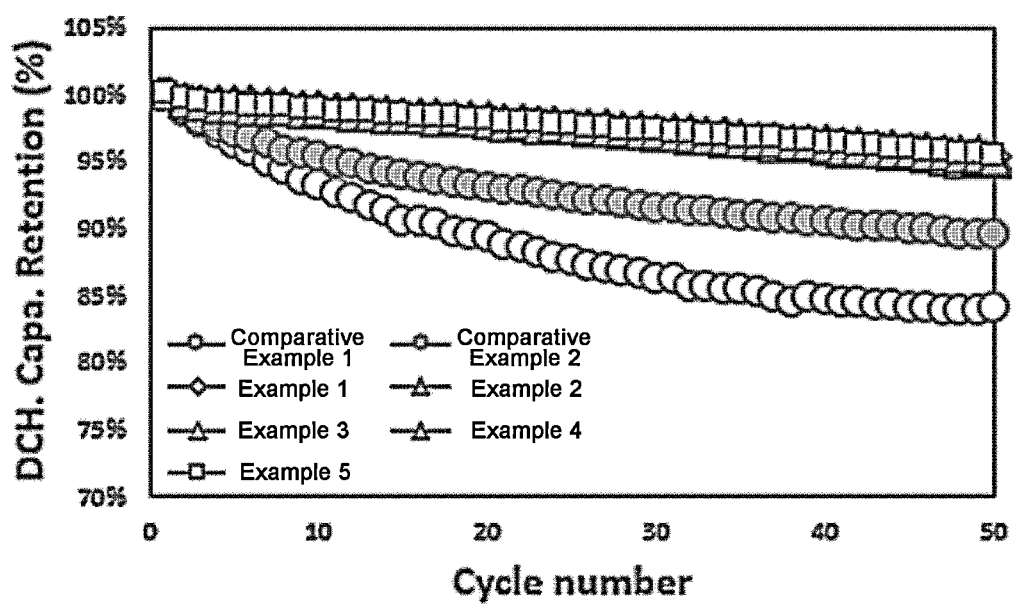
FIG. 11 shows life cycle analysis results of the comparative examples and the examples.

FIGS. 10 and 11 and Table 2 can confirm that the examples showed an improved life cycle compared with the comparative examples. This is due to the result of solving the problems of cycle life deterioration and voltage decay resulting from phase transition during cycling of the over-lithiated layered oxide, through a phase difference of C2/m and R-3m in the core and the shell.

Figure 12:
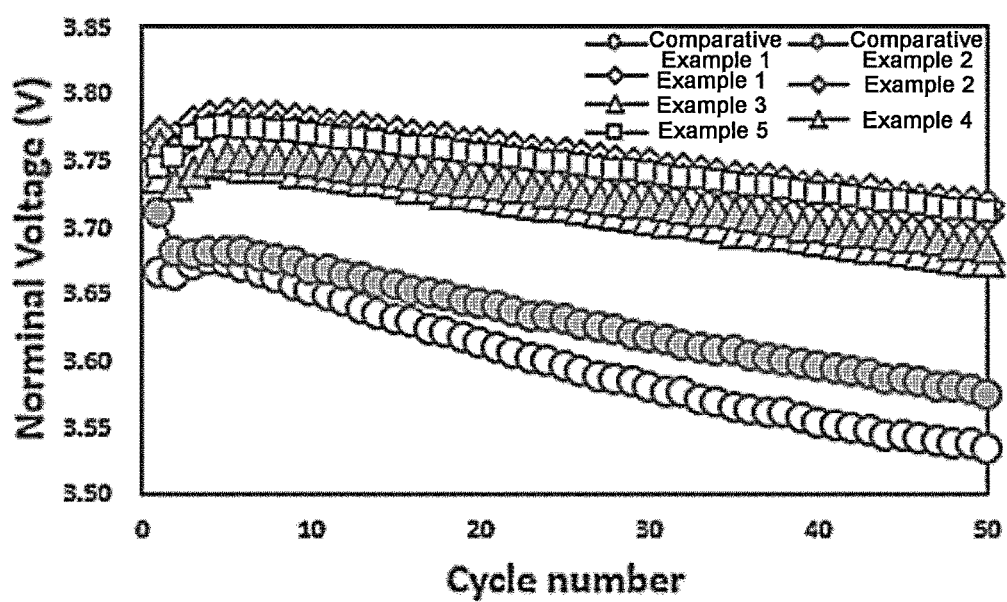
FIG. 12 shows voltage analysis results of the comparative examples and the examples.
Figure 13:
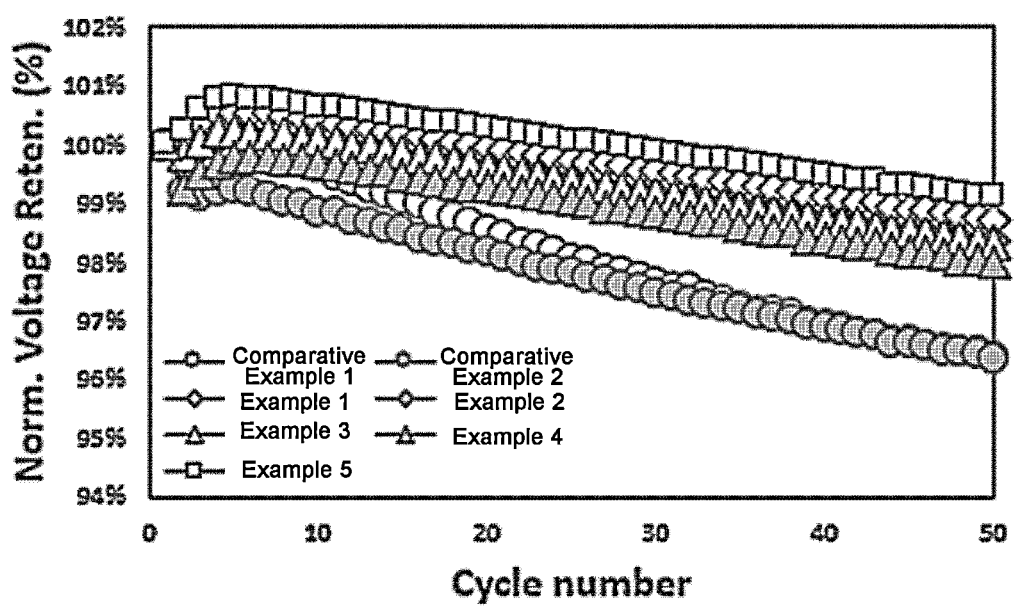
FIG. 13 shows voltage analysis results of the comparative examples and the examples.

FIGS. 12 and 13 and Table 2 can confirm that the examples showed suppressed voltage decay compared with the comparative examples. This is due to the results of improving kinetic and structural stability in the particle surface by allowing the crystal structure in the surface to be further assigned to the crystal structure of the space group R-3m, through a phase difference of C2/m and R-3m in the core and the shell.

FIGS. 7 to 13 and Table 2 below could confirm that even the cathode active material of Example 5 containing no cobalt and employing wet coating with nickel (Ni) showed significantly improved performance of lithium secondary batteries.

TABLE 1

| ITEM | | | Comparative Example 1 | Comparative Example 2 | Example 1 | Example 2 | Example 3 | Example 4 | Example 5 |
|---|---|---|---|---|---|---|---|---|---|
| precursor | Ni | mol % | 40 | 40 | 40 | 40 | 40 | 40 | 40 |
| | Co | | 0 | 10 | 0 | 0 | 0 | 0 | 0 |
| | Mn | | 60 | 50 | 60 | 60 | 60 | 60 | 60 |
| 1st thermal treatment | Temperature | ° C. | 550 | 550 | 550 | 550 | 550 | 550 | 550 |
| precursor coating | NCM (coating) | mol % | — | — | Co10 | Co5 | — | — | Ni5 |
| 2nd thermal treatment | Temperature | ° C. | 900 | 850 | 850 | 900 | 850 | 900 | @900 |
| lithium sintered product | Li/M | ratio | 1.25 | 1.30 | 1.25 | 1.25 | 1.25 | 1.25 | 1.25 |
| coating | NCM (coating) | mol % | — | — | — | — | Co10 | Co5 | — |
| 3rd thermal treatment | Temperature | ° C. | — | — | — | — | 800 | 800 | — |
| lithium | Li/M (coating) | ratio | — | — | — | — | 1.0 | 1.0 | — |

TABLE 2

| | ITEM | | Comparative Example 1 | Comparative Example 2 | Example 1 | Example 2 | Example 3 | Example 4 | Example 5 |
|---|---|---|---|---|---|---|---|---|---|
| initial (@25° C.) 0.1 C. 2.0-4.6 V | CH. | mAh/g | 221.3 | 280.5 | 254.5 | 259.0 | 259.9 | 259.1 | 259.7 |
| | DCH. | | 193.6 | 225.6 | 224.8 | 224.0 | 229.8 | 227.7 | 226.7 |
| | Eff. | % | 87.5 | 80.4 | 88.3 | 86.5 | 88.4 | 87.9 | 87.4 |
| rate capability 5 C./0.1 C. | Rate | % | 40.4 | 64.4 | 72.2 | 69.9 | 67.6 | 67.3 | 68.5 |
| life cycle (@25° C.) 1 C./1 C. 2.0-4.6 V | Cycle Life (50 cy.) | | 84.1 | 89.5 | 95.4 | 94.9 | 95.5 | 95.1 | 95.5 |
| | Voltage Decay (50 cy.) | | 96.4 | 96.3 | 98.7 | 98.3 | 98.3 | 98.0 | 99.1 |

The invention claimed is:

1. A cathode active material for a secondary battery, comprising a lithium composite oxide represented by Formula 1 below and containing a layered structure of over-lithiated oxide, wherein the lithium composite oxide includes a secondary particle, the secondary particle includes at least one primary particle, and the primary particle includes at least one crystallite; at least one of the secondary particle, the primary particle, or the crystallite comprises a core and a shell occupying at least a part of the surface of the core, and when a crystal structure assigned to a space group C2/m is defined as [C2/m], a crystal structure assigned to a space group R-3m is defined as [R-3m], and the ratio of the crystal structure assigned to the space group C2/m to the crystal structure assigned to the space group R-3m is defined as [C2/m]/[R-3m], the [C2/m]/[R-3m] in the core of the secondary particle is greater than in the shell of the secondary particle, the [C2/m]/[R-3m] in the core of the primary particle is greater than in the shell of the primary particle, or the [C2/m]/[R-3m] in the core of the crystallite is greater than in the shell of the crystallite, and at least one of the secondary particle, the primary particle, and the crystallite includes a phase gradient portion in which [C2/m]/([C2/m]+[R-3m]) has a gradient toward the center from the surface of the selected at least one:

$$rLi_2M1O_3 \cdot (1-r)Li_aM2O_2 \quad \text{[Formula 1]}$$

where, $0<r<1$ and $0<a\leq1$; M1 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi; and M2 is at least one of Mo, Nb, Fe, Cr, V, Co, Cu, Zn, Sn, Mg, Ni, Ru, Al, Ti, Zr, B, Mn, Na, K, Y, P, Ba, Sr, La, Ga, Gd, Sm, W, Ca, Ce, Ta, Sc, In, S, Ge, Si, and Bi.

2. The cathode active material for a secondary battery of claim 1, wherein the [C2/m]/[R-3m] is greater in the core than in the shell of the secondary particle.

3. The cathode active material for a secondary battery of claim 1, wherein the [C2/m]/[R-3m] is greater in the core than in the shell of the primary particle.

4. The cathode active material for a secondary battery of claim 1, wherein the [C2/m]/[R-3m] is greater in the core than in the shell of the crystallite.

5. The cathode active material for a secondary battery of claim 1, wherein at least one of the secondary particle, the primary particle, or the crystallite includes [C2/m] and [R-3m] present in a mixed state in the core of the selected at least one.

6. The cathode active material for a secondary battery of claim 1, wherein the shell of at least one of the secondary particle, the primary particle, or the crystallite has a crystal structure assigned to the space group R-3m.

7. The cathode active material for a secondary battery of claim 1, wherein in the lithium composite oxide, the [C2/m]/[R-3m] is not greater than 1.

8. The cathode active material for a secondary battery of claim 1, wherein the cathode active material contains cobalt (Co) or contains no cobalt (Co).

9. A secondary battery, comprising the cathode active material of claim 1.

* * * * *